(12) United States Patent
Van Oosten et al.

(10) Patent No.: US 10,031,356 B2
(45) Date of Patent: Jul. 24, 2018

(54) FAIL SAFE MECHANISM FOR SWITCHABLE WINDOW

(71) Applicant: Merck Patent GmbH, Darmstadt (DE)

(72) Inventors: Casper Van Oosten, CN Waalre (NL); Felix Schlosser, Wurzburg (DE)

(73) Assignee: Merck Patent GmbH, Darmstadt (DE)

( * ) Notice: Subject to any disclaimer, the term of this patent is extended or adjusted under 35 U.S.C. 154(b) by 171 days.

(21) Appl. No.: 14/903,763

(22) PCT Filed: Jul. 9, 2014

(86) PCT No.: PCT/EP2014/064670
§ 371 (c)(1),
(2) Date: Jan. 8, 2016

(87) PCT Pub. No.: WO2015/004168
PCT Pub. Date: Jan. 15, 2015

(65) Prior Publication Data
US 2016/0161780 A1 Jun. 9, 2016

(30) Foreign Application Priority Data

Jul. 11, 2013 (EP) .................................. 13176025

(51) Int. Cl.
*G02F 1/133* (2006.01)
*G02F 1/17* (2006.01)
(Continued)

(52) U.S. Cl.
CPC ............ *G02F 1/13306* (2013.01); *E06B 9/24* (2013.01); *G02F 1/172* (2013.01); *B60J 3/04* (2013.01);
(Continued)

(58) Field of Classification Search
None
See application file for complete search history.

(56) References Cited

U.S. PATENT DOCUMENTS 6,055,089 A    4/2000  Schulz et al.
7,535,614 B1 *  5/2009  Tapley ...................... B60J 3/04
                                                          345/105
(Continued)

FOREIGN PATENT DOCUMENTS

CN    102108757 A    6/2011
CN    102472941 A    5/2012
(Continued)

OTHER PUBLICATIONS

International Search Report dated Aug. 14, 2014 issued in corresponding PCT/EP2014/064670 application (pp. 1-4).
(Continued)

*Primary Examiner* — Edward Glick
*Assistant Examiner* — Anthony G Quash
(74) *Attorney, Agent, or Firm* — Millen, White, Zelano and Branigan, P.C.

(57) ABSTRACT

An optical device, having an active matrix, containing polymer dispersed liquid crystals, guest-host liquid crystals, suspended particles and/or polymer stabilized cholesteric liquid crystals, the active high transmissive mode has at least 40% of incoming light transmitted through the optical device and in low transmissive mode less than 40% of incoming light transmitted through the optical device, the active matrix is switchable between high transmissive mode and low transmissive mode. The optical device containing a fail-safe mechanism, which is capable to switch the active matrix from a low transmissive mode in a high transmissive mode without the power of an applied grid.
The optical device has a fail-safe mechanism comprising at least one battery and a controller.

7 Claims, 3 Drawing Sheets

(51) Int. Cl.
*E06B 9/24* (2006.01)
*B60J 3/04* (2006.01)

(52) U.S. Cl.
CPC ............ *E06B 2009/2417* (2013.01); *E06B 2009/2464* (2013.01); *G09G 2330/027* (2013.01); *G09G 2330/12* (2013.01)

(56) References Cited

U.S. PATENT DOCUMENTS

| | | | |
|---|---|---|---|
| 8,031,277 | B2 | 10/2011 | Maisuradze et al. |
| 8,760,749 | B2 | 6/2014 | Melcher et al. |
| 2004/0160538 | A1* | 8/2004 | Li ............... C09K 19/544 349/16 |
| 2007/0242174 | A1 | 10/2007 | Maisuradze et al. |
| 2007/0285759 | A1* | 12/2007 | Ash ............... B60J 3/04 359/275 |
| 2012/0134004 | A1 | 5/2012 | Melcher et al. |
| 2013/0235323 | A1* | 9/2013 | Sotzing ............ C09K 9/02 351/44 |
| 2015/0270519 | A1* | 9/2015 | Nishizaka ........ D04H 1/4291 429/254 |

FOREIGN PATENT DOCUMENTS

| | | |
|---|---|---|
| CN | 203271490 U | 11/2013 |
| WO | 2006/005968 A1 | 1/2006 |

OTHER PUBLICATIONS

Written Opinion of the International Searching Authority dated Aug. 14, 2014 issued in corresponding PCT/EP2014/064670 application (pp. 1-8).
Chinese Office Action dated Dec. 16, 2016 issued in corresponding CN 201480039068.9 application (8 pages).
English Abstract of CN 102108757 A published Jun. 29, 2011.
English Abstract of CN 102472941 A published May 23, 2012.
English Abstract of CN 203271490 U published Nov. 6, 2013.

\* cited by examiner

FAIL SAFE MECHANISM FOR SWITCHABLE WINDOW

The present invention pertains to an optical device having an active matrix, whereby the active matrix contains polymer dispersed liquid crystals, guest-host liquid crystals suspended particles and/or polymer stabilized cholesteric liquid crystals, the active matrix has a high transmissive mode and a low transmissive mode, whereby in the high transmissive mode at least 40% of incoming light is transmitted through the optical device and in the low transmissive mode less than 40% of incoming light is transmitted through the optical device, whereby the active matrix is switchable between the high transmissive mode and the low transmissive mode and vice versa.

Such optical devices are known in form of switchable windows.

Switchable windows or smart windows are well known in the prior art. One category of switchable windows is electronically controlled switchable windows. Electronically controlled switchable windows need an electronic current or voltage to change its transmissive modes. The invention pertains not to electrochromic switchable windows.

Electrochromic switchable windows consist of a multi-layer stack wherein ions can be moved from one layer to the other layer using an electric field. At least one of the two layers has the properties that it is electrochromic, that is it changes its absorptive properties by reduction or oxidation. By varying the voltage, the reduction or oxidation states can be controlled and the transmission of the window can be changed.

Regular electronically switchable windows do not meet safety criteria. For example, in document DE102011015950 a switchable window is disclosed that is based on polymer dispersed liquid crystal technology, which falls back to its scattering (low transmissive) mode when not powered. In case of a fire, which interrupts the grid and thus the power system of this window, escape of the building is difficult due to less visibility through the window. This is not a safe condition.

Another switchable window is presented in DE3330305, which is based on liquid crystals incorporating a polarizer sheet and optionally dyed liquid crystals. This system is in its low transmissive mode when no voltage is supplied, and can be brought to its high transmissive mode by applying an AC (alternating current) voltage. Also this system is not fail-safe: if the voltage fails, it falls back to its low-transmissive state.

In US2012318466 a switchable window is disclosed which is based on suspended particle technology, which falls back into its low transmissive mode, when not powered.

In order to build safe electronically switchable windows, it is possible to design systems that are intrinsically fail-safe. For example, the system in DE3330305 can be redesigned to a fail-safe system by changing the materials in the device to have a so-called 'vertically aligned' (VA) liquid crystal mode. This requires a different liquid crystal material and a different alignment layer for the liquid crystals. However, changing the materials would limit the options to build the device. This results in a reduction of the design freedom and could lead to more expensive devices.

The aim of the present invention is to create an optical device, which guarantees high safety requirements and a high freedom in design.

The aim is achieved by an optical device, having an active matrix, whereby the active matrix contains polymer dispersed liquid crystals, guest-host liquid crystals, suspended particles and/or polymer stabilized cholesteric liquid crystals, the active matrix has a high transmissive mode and an low transmissive mode, whereby in the high transmissive mode at least 40% of incoming light is transmitted through the optical device and in the low transmissive mode less than 40% of incoming light is transmitted through the optical device, whereby the active matrix is switchable between the high transmissive mode and the low transmissive mode and vice versa, by applying under application of continuous electrical voltage the active matrix is in the high transmissive mode and without an electrical voltage the active matrix is in the low transmissive mode, whereby the supplied applied electrical voltage for the high transmissive mode is provided by a grid, whereby the optical device exhibits further contains a fail-safe mechanism, which is capable to switch the active matrix from a low transmissive mode in a high transmissive mode without the power of the grid.

Due to the fact that the optical device is in a high transmissive mode only by applying a voltage there is more freedom to design such a switchable optical device. The fail-safe mechanism supplies the power to the optical device which allows it to steer it to its high transmissive mode in case of power failure from the grid. This removes the need to use materials or designs that intrinsically have this fail-safe mechanism and thus allows many more electrically switchable optical device types to be used in locations that require a fail-safe mode.

In sense of this invention the term "transmissive" means the fraction of incident light (electromagnetic radiation) at a specified wavelength (here light in the visible spectrum in the range of 390 nm to 790 nm) that passes through the active matrix and thus through the optical device. In a high transmissive mode at least 40%, more preferred at least 50%, and most preferred at least 60% of the incoming light (also here light in the visible spectrum) passes through the active matrix and less than 60% of the incoming light is scattered, reflected or absorbed. In the low transmissive mode less than 40%, more preferred less than 30% and most preferred less than 10% of the incoming light (visible spectrum) passes through the active matrix (and thus through the optical device) and at least 60% of the incoming light is scattered, reflected or absorbed.

The term "active matrix has a high transmissive mode and a low transmissive mode" means that the active matrix is changeable in such a way, that a high transmission or a low transmission occurs. With liquid crystals the active matrix can be aligned in a way that a high transmission is possible and in an alignment, which results in a low transmission. It should be understood, that a plurality of transmission levels are possible depending on the alignment of the liquid crystals. High and low transmissions are only mentioned (end) points.

Suspended particles windows mean thin film laminates of rod-like particles of nanometer scale, suspended in a liquid and laminated onto or between glass or plastic sheets. Without applied voltage, the particles orient randomly, thus blocking and absorbing light. Upon application of a voltage, the particles orient perpendicular to the plane of the laminate and light is allowed to pass.

Preferably the fail-safe mechanism activates a fail-safe mode, when the connection between grid and optical device is undesirably interrupted and no power of the grid is supplied to the optical device.

A grid is defined as an interconnected network for delivering electricity from a main power source to electricity demanding devices. The grid is preferably the standard power supply system which is connected to the optical device and powers the optical device in all situations except the fail-safe mode (in an emergency for example). A battery is not a grid in the sense of this invention.

Preferably, the fail-safe mechanism is capable to switch the active matrix from the low transmissive mode in the high transmissive mode, under application of a direct current (DC) voltage which is optionally convertible into an alternating-current (AC) voltage. Preferably, a power-inverter is (electronically) connected between the fail-safe mechanism and the optical device, which converts the direct current voltage in an altering-current voltage.

If the optical device is in a high transmission mode when the connection to the grid is interrupted, it is also possible that the fail-safe mechanism remains at the high transmission mode, preferably by powering the optical device via direct-current voltage (which can optionally be converted in altering-current voltage by a power inverter).

Preferably in the fail-safe mode an electrical voltage is supplied to the optical device by at least one battery. From safety perspective, the high transmissive mode during power failure is only required for a limited time. This time should be at least 10 minutes. Due to the use of a battery power for at least 10 minutes is obtainable and the safety requirements can be meet. Due to the use of at least one battery the fail-safe mode becomes independent from the grid and is therefore not concerned if the grid is destroyed by external influences.

Preferably the fail-safe mechanism contains a controller for activating the fail-safe mode, if no voltage is supplied by the grid. Preferably an electrical voltage is applied to the optical device via the controller in the fail-safe mode by at least one energy storing device. This at least one energy storing device is preferably at least one battery. The controller detects the grid, whereby without a connection between grid and optical device (no electrical voltage is supplied by the grid) the controller activates the fail-safe mode. Due to this fail-safe mechanism the optical device is also transparent without voltage supplied by the grid. In case of a fire for example, the connection to the grid can be destroyed, the controller will register this fact and starts the fail-safe mode. The fail-safe mode applies a voltage to the optical device (preferably to the controller, which controls and switch the optical device), whereby the optical device is transferred to the high transmissive mode (independent from which mode the optical device was before). Therefore, the fail-safe mechanism guarantees that light can pass through the optical device (and thus an unobstructed view is achieved), without a voltage from the grid. If the optical device is a switchable window for example, such a fail-safe mechanism holds the window in a high transmissive mode (independently from the grid). Therefore, people can leave the building supported by light which shines through the switchable window.

In a preferred embodiment at least 1 to 20, more preferred 2 to 5 batteries are used for the fail-safe mode. The number of batteries for the fail-safe mode depends on the kind of batteries and the optical device itself. If the optical device is a switchable window the number of required batteries is selected in this way that the window remains at least 30 minutes in the high transmissive mode without voltage by the grid before the window switched to the low transmissive mode. This time frame is normally sufficient for the evacuation of a building in case of an emergency.

Preferably the at least one energy storing device, preferably the at least one battery, is located in the frame of the optical device. Preferably the at least one battery has a heat protection. In this preferred embodiment the at least one battery is not visible for a person who looks at the optical device. In addition, the at least one battery can easily be isolated against heat, moisture and dust within the frame of the optical device. Due to this the life time of the at least one battery increases and it is guaranteed that the at least one battery works in the fail-safe mode. Preferably, batteries with high temperature resistance are used. To further help operation of the battery, the heat protection of the battery will preferably delay heating of the battery to its failure temperature during at least 10 minutes. A kind of heat protection for the at least one battery is a cover for the at least one battery, whereby the cover has high heat-resistant properties. The at least one battery is preferably entirely covered by this cover.

This new fail-safe mechanism exceeds the present state of technology in a way that the fail-safe mechanism is now an active system. An active system will lead to a technology which makes it possible for the designer of such devices to make a device which has a high transmission mode when consuming electrical power. This could lead to an extension of the possibilities of the designers and probably to more available products.

Preferably, the at least one battery is a nickel-metal hydride battery. Due to the use of at least one nickel-metal hydride battery the optical device is also usable in the field of insulation glass. Safety tests on insulation glass demand the glass to stay stable up to 56 degrees Celsius. State of the art lithium ion and rechargeable batteries can only function up to 45 and 55 degrees Celsius respectively. So switchable windows with a fail-safe mechanism based on these batteries would not pass the safety test for insulation glass. Switchable windows with fail safe mechanism based on new generation batteries, i.e. nickel-metal hydride batteries, will pass this test.

In a preferred embodiment the at least one battery is cylinder or button shaped. Due to this special shape the at least one battery is invisibly integrated into the frame of the optical device and the frame is not bigger than frames without the at least one battery.

If more than two batteries are used for the fail-safe mechanism the batteries may have different shapes or the same shape. In addition, more than one kind of battery can be used for the fail-safe mechanism, for example nickel-metal hydride batteries in combination with nickel-cadmium batteries.

Preferably the optical device comprises a photovoltaic element for powering at least one rechargeable battery (as at least one energy storing device).

In a preferred embodiment the optical device is a switchable window.

Electrochromic (EC) type switchable glazing has the downside that a limited range of colors is available for the tinted shade of the glass, and that the switching may take minutes to complete. It is noted that U.S. Pat. No. 7,535,614 describes an electrochromic (EC) cell that is bi-stable. A voltage is applied to reduce the transparency in this device. After that the voltage is removed and the low transparency remains. By either short-cutting the electrochromic cell when the input power is turned off or by applying a negative (reverse) voltage the electrochromic cell is cleared and switches to high transparency.

US 2007/0285759 also discloses a variable transmittance window. Here, a rapid bleaching function is installed that shorts the device to ground in case the voltage falls below a predetermined value and causing the electrochromic window to clear. No fail-safe mechanism is disclosed in this document.

In GB 1,186,541 and also in GB 1 356 120 for example electro-optical devices are disclosed that are commonly known as electrochromic windows. These electrochromic windows retain their high transmissive mode when the electrical circuit is interrupted. Due to this requirement for the switchable window the design is limited. This means that the window should be designed in such a way that it falls back to the high transmissive mode of the window when no electrical power is available (for safety reasons).

Thus, the fail safe system uses power to discharge the switchable window ("short" it) and bring it to the transparent state. Such a system would not work as fail safe for LCD (liquid crystal display) windows, SPD (suspended particle display) windows or PDLC (polymer dispersed liquid crystal display) windows as short circuiting brings the system to the low transmitting state.

For the (guest-host) LCD windows, SPD windows, or PDLC windows of the present, a charged state to make it transparent rather than a discharged state is needed. More precisely, a voltage is applied on the window, which continuously charges and discharges the window.

A control system as described in art on a LCD/SPD/PDLC window, would thus not bring the system to the low-transmissive state which is not wanted.

Further for the devices of the present invention (LC/PDLC/SPD), a power supply is needed that supplies power for as long as the safe state is required.

Preferably, a switchable window consists of one or two transparent glass(es) or polymer substrates with two transmissive conducting layers. One transmissive conductive layer is preferably on top of one of each substrate. A sandwich is made from the two substrates with the conductive layers on the inside of the sandwich. Between the two substrates the active matrix is arranged. The active matrix changes the amount of light passing through it upon change of electrical power that is supplied to the conductive layers. In case of a single substrate window the active matrix is on top of the substrate. Switchable windows in the sense of the present invention are LC (liquid crystal) based windows where the active matrix consists completely or partially of materials in the liquid crystalline state of matter, or suspended particle displays (SPD), where small particles are suspended in a solvent (GB 1385505). There are different types of liquid crystal display (LCD) windows, all having a different liquid crystalline matrix. Examples are polymer dispersed liquid crystalline displays (PDLC) (KR20090109927), guest-host liquid crystalline displays (WO2009141295A1) and polymer stabilized cholesteric displays (U.S. Pat. No. 5,940,150).

The invention pertains also to a fail-safe mechanism for an optical device mentioned above. Preferably, the fail-safe mechanism of the optical device exhibits at least one energy storing device and a controller. The energy storing device is preferably at least one battery.

Preferably the controller is capable of releasing a fail-safe mode, if a connection between optical device and a grid is interrupted. In this case the optical device (preferably via the controller) is preferably powered by the at least one energy storing device.

Preferably the at least one energy storing device of the fail-safe mechanism is capable to apply a voltage to the optical device in the fail-safe mode in order to keep or transfer the optical device in a high transmission mode without the power of a grid. The voltage is preferably a direct-current (DC) voltage and the at least one energy storing device is preferably at least one battery. If the energy storing device is a battery—in one preferred embodiment a power inverter converts the direct-current voltage to an altering-current voltage, before the voltage is applies to the optical device. This embodiment is especially preferred if the optical device is a suspended particle device or a device based on liquid crystals as active matrix.

All preferred embodiments regarding the form of the at least one battery, the kind of at least one battery, the embodiments of the optical device (switchable window and the mentioned liquid crystals for the switchable window or the embodiment in which the optical device is a suspended particle device) are also possible in respect to the fail-safe mechanism.

The invention may best be understood by reference to the following drawings 1 to 5. The figures are examples intended to describe preferred embodiments and should not be construed in any manner as limiting the scope of the invention as set forth in the accompanying claims.

BRIEF DESCRIPTION OF THE DRAWINGS

In FIG. 1 a fail-safe mechanism 10 in combination with an optical device 1 (for example a switchable window) and a grid 4 is schematically shown. The fail-safe mechanism 10 exhibits at least a controller 8 and at least one energy storing device in form of at least one battery 9. In a preferred embodiment a plurality of batteries 9 are connected via a controller 8 with the optical device 1. The batteries 9 applied have to withstand high temperatures like ni-metal hydride batteries (Varta V150HT), so they keep functioning in case of a fire. The batteries 9 can be in a button or a cylinder shape and integrated in the frame of the optical device 1. The batteries 9 are connected to the electrical system of the optical device 1. During a shutdown in power supplied by a grid 4 (which transfers the switchable window 1 in a low transmissive mode 3, not shown in FIG. 1), the optical device 1 can rely on the batteries 9 for electrical power. The batteries 9 are immediately activated when the power that supplies the switchable window 1 with energy is interrupted. As soon as the batteries 9 are activated the optical device 1 will go into a high transmission mode 2 (not shown in FIG. 1). This fail-safe mechanism can be used for switchable windows 1 like PDLC windows, Liquid crystalline guest-host windows, and suspended particle displays.

In FIG. 2 a general constitution of a prior art optical device 1 in form of a switchable window is shown. The switchable window exhibits two glass or transparent polymer substrates 5 with a transmissive conducting film 6 (electrodes 6 for example). A gap between the two glass substrates 5 is filled with an active matrix 7, for example a liquid crystal 7. In the switchable windows of the prior art the active matrix 7 is in a random orientation when no power is supplied to the switchable window. Thus, the switchable window is in a low transmissive mode 3 without power of a grid 4. In case of an accident (for example a fire) the connection of grid 4 and window is destroyed, the window goes in the low transmission mode 3 and evacuation of human beings out of the building is hindered. Such a window is therefore unsafe and does not fulfill safety requirements.

In FIG. 3 the optical device (switchable window) of FIG. 2 is shown in a high transmissive mode 2. Here the grid 4 powers the switchable window (a voltage is supplied) and thus the active matrix 7 is arranged in a high transmission mode 2.

In FIG. 4 an optical device 1 in form of a switchable window according to FIG. 2 or 3 with inventive fail-safe mechanism 10 is shown. The connection between grid 4 and optical device 1 is undesirably disconnected (due to an accident for example) and thus no power is supplied to the optical device 1 by the grid 4. Now the novel fail-safe mechanism 10 starts the fail-safe mode. The controller 8 detects the undesirable disconnection between optical device 1 and grid 4 and takes care that the optical device 1 is now powered by the at least one energy storing device 9 (batteries). Due to this additional powering system the optical device 1 remains in the high transmission mode 2 or returns immediately to the high transmission mode 2 after powering of the grid 4 is interrupted. This means as soon as the controller 8 detects that there is a power shutdown from the grid 4 the switchable window 1 will be foreseen with energy by the battery 9. Due to the power supply by the battery 9 the switchable window will go to the transparent/transmissive mode (high transmission mode 2). In a preferred embodiment a power inverter 11 converts the voltage of the battery 9 (direct-current voltage) to an altering-current voltage before the voltage is applies to the optical device (preferably via the controller 8). The presented fail-safe mode functions for the failure of the power supply from the grid 4 to the switchable window. In case of an internal failure in the switchable window itself, it still might be possible that the switchable window will not go to the transmissive mode 2. But these fail-safe modes are designed for a case of an emergency. In most cases the failure in such a situation is located in the grid 4 and the loss of power supply by the grid 4 to the switchable window. Another advantage of a battery 9 based fail-safe mechanism 10 is also, that only the wiring of the fail-safe mechanism 10 (controller 8, battery 9) has to be isolated against heat in case of a fire. If the grid connection has to be isolated this will be much more expensive. In a switchable window with the fail-safe mechanism 10 it does not matter if the wiring of connection of the switchable window to the grid 4 is destroyed during a fire, since the battery 9 will take over the power supply.

FIG. 5 shows a switchable window, as an example for an optical device 1, in a low transmissive mode 3, whereby a fail-safe mode is off. In polymer dispersed liquid crystal devices (PDLCs) as optical devices 1, liquid crystals 7 are dispersed into a liquid polymer matrix. With no supplied voltage, the liquid crystals 7 are randomly arranged in the droplets, resulting in scattering of light as it passes through the smart window assembly (low transmission mode 3). This results in the translucent, "milky white" appearance. When a voltage is supplied to electrodes 6, the electric field formed between the two transparent electrodes 6 on the glass 5 causes the liquid crystals 7 to align, allowing light to pass through the droplets with very little scattering and resulting in a transparent state (high transmission mode 2). During a power shutdown of the grid 4 the switchable window will be in the low transmission mode 3. The fail-safe mechanism 10 will detect this event immediately. In FIG. 5 the optical device 1 of FIG. 4 with fail-safe mechanism is shown in a normal mode (this means no fail-safe mode is activated). Here a disconnection between grid 4 and optical device 1 does not cause the fail-safe mode. The controller 8 recognizes that the disconnection was desired (to switch the optical device 1 in a low transmission mode 3) and no emergency has occurred. If a user will activate the low transmission mode 3 preferably a signal is transferred to the controller 8. Due to this signal the controller 8 can distinguished between a desired unpowered connection between grid 4 and optical device 1 and an undesirable disconnection between grid 4 and optical device 1. For safety reasons the controller 8 can also comprise some sensors (for example for heat and smoke). Even if the optical device 1 is in a desired low transmission mode 3, the controller 8 detects an accident (for example a fire) and switches the optical device 1 in a high transmissive mode 2.

Figure 1:
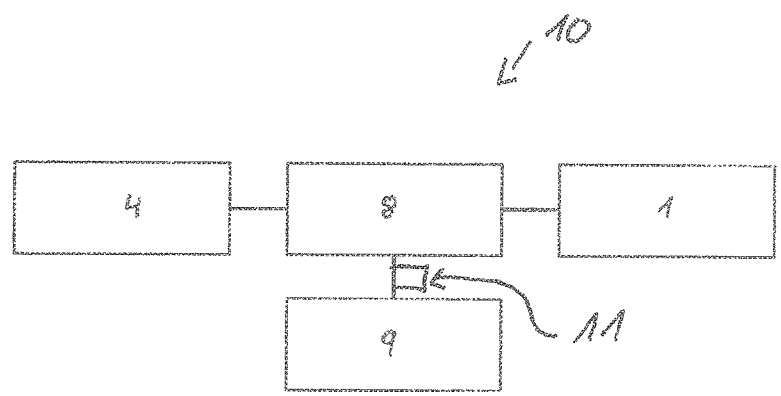
FIG. 1 shows schematically an example for a fail-safe mechanism
Figure 2:
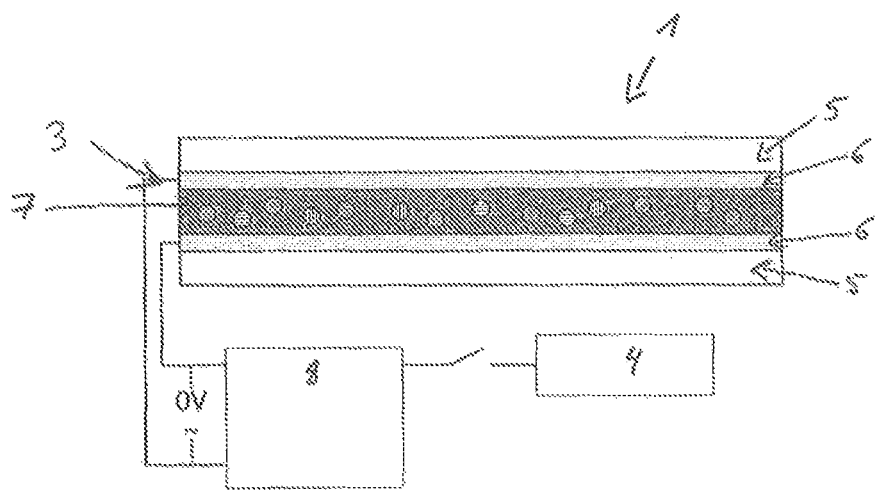
FIG. 2 shows schematically an optical device in a low transmissive mode according to the prior art
Figure 3:
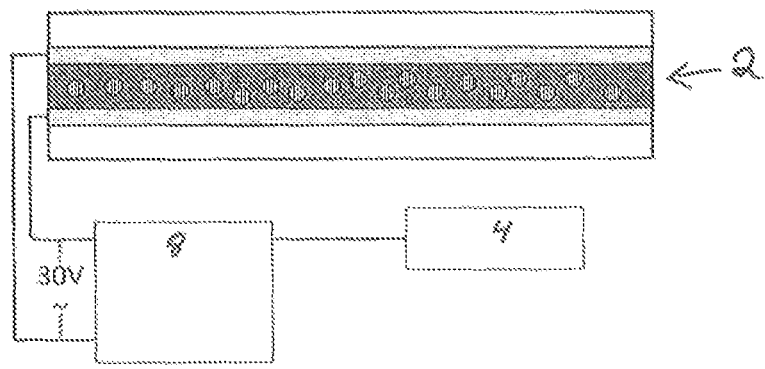
FIG. 3 shows schematically an optical device in a high transmissive mode according to the prior art.
Figure 4:
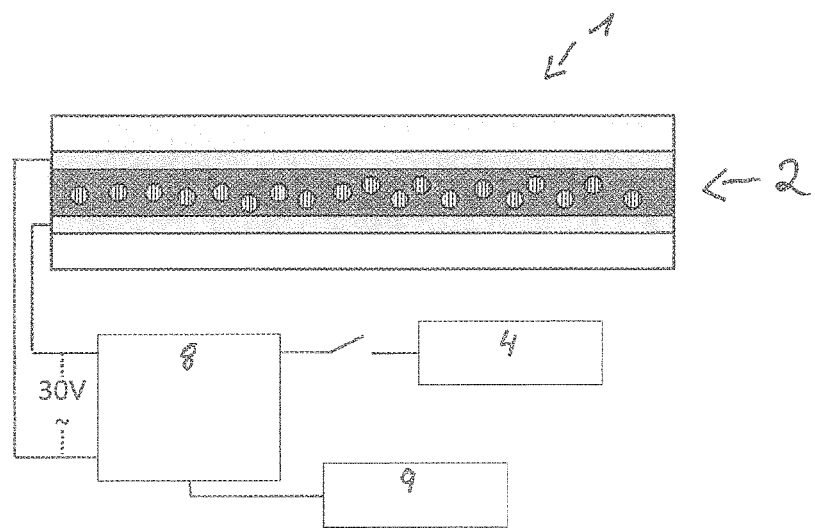
FIG. 4 shows an optical device with fail-safe mechanism in a fail-safe mode.
Figure 5:
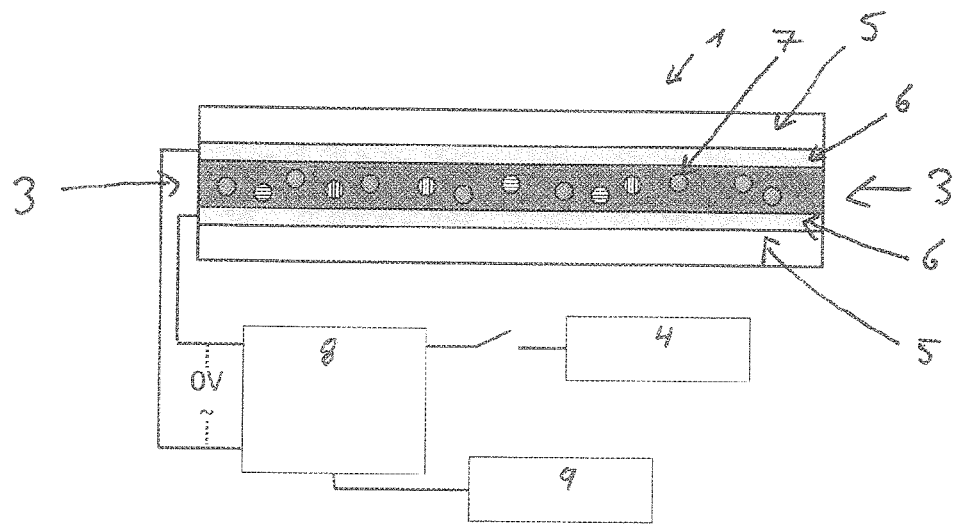
FIG. 5 shows an optical device with a fail-safe mechanism, whereby the fail-safe mode is off.

REFERENCE NUMBERS 1 optical device
2 high transmissive mode
3 low transmissive mode
4 grid
5 glass or polymer substrate
6 transmissive conductive film/electrodes
7 active matrix/liquid crystal
8 controller
9 battery
10 fail-safe mechanism
11 power inverter

The invention claimed is:

1. An optical device (1), having an active matrix (7), wherein the active matrix (7) comprises polymer dispersed liquid crystals, guest-host liquid crystals, suspended particles or polymer stabilized cholesteric liquid crystals, the active matrix (7) has a high transmissive mode (2) and a low transmissive mode (3), wherein in the high transmissive mode (2) at least 40% of incoming light is transmitted through the optical device (1) and in the low transmissive mode (3) less than 40% of incoming light is transmitted through the optical device (1), wherein the active matrix (7) is switchable between the high transmissive mode (2) and the low transmissive mode (3) and vice versa, wherein under application of continuous electrical voltage the active matrix (7) is in the high transmissive mode (2) and without an electrical voltage the active matrix (7) is in the low transmissive mode (3), wherein the applied electrical voltage for the high transmissive mode (2) is provided by a grid (4), the optical device (1) further comprises a fail-safe mechanism (10) that switches the active matrix (7) from a low transmissive mode (3) to a high transmissive mode (2) without the power from the grid (4), wherein the fail-safe mechanism (10) comprises at least one energy storing device (9), and a controller (8), said controller (8) activating a fail-safe mode if no voltage is applied by the grid, said energy storing device applying voltage to the optical device (1) in the fail-safe mode, such that the optical device (10) is in the high transmission mode (2) without the power from the grid (4).

2. The optical device (1) according to claim 1, wherein said energy storage device (9) provides direct-current (DC) voltage and further comprising a power inverter that converts the DC voltage into alternating-current (AC) voltage.

3. The optical device (1) according to claim 1, wherein in the fail-safe mode an electrical voltage is applied to the optical device (1), via the controller (8), by at least one energy storing device (9), that is at least one battery (9).

4. The optical device (1) according to claim 3, further comprising a frame, wherein the frame of the optical device (1) comprises the at least one energy storing device (9).

5. The optical device (1) according to claim 3, wherein the at least one battery is a nickel-metal hydride battery.

6. The optical device (1) according to claim 3, wherein the at least one battery is cylinder or button shaped.

7. The optical device (1) according to claim 1, wherein the optical device (1) is a switchable window (1).

* * * * *